United States Patent [19]
Boyd

[11] 3,783,372
[45] Jan. 1, 1974

[54] ELECTRICAL TEST APPARATUS INCLUDING HIGH GAIN AMPLIFIER CIRCUIT

[75] Inventor: James C. Boyd, Fairborn, Ohio

[73] Assignee: The National Cash Register Company, Dayton, Ohio

[22] Filed: May 19, 1972

[21] Appl. No.: 255,067

[52] U.S. Cl. .............................. 324/158 T, 324/51
[51] Int. Cl. ..................... G01r 31/22, G01r 31/02
[58] Field of Search..................... 324/123, 51, 133, 324/72.5, 158 T; 340/248 R, 248 N, 253 B

[56] References Cited
UNITED STATES PATENTS 3,566,266  2/1971  Bloom ......................... 324/123 R X
3,617,881  11/1971  McCormick ................. 324/123 R X Primary Examiner—Alfred E. Smith
Attorney—J. T. Cavender et al.

[57] ABSTRACT

A test apparatus comprising an amplifier circuit including a high gain or operational amplifier and readout means connected to an output means or lead of the amplifier circuit. The amplifier circuit is adapted to produce a first value output (current or voltage) in the readout means with the input means or leads of the amplifier circuit connected in an open circuit. The amplifier circuit includes amplifier offset producing means which causes a second value output (current or voltage), distinctively different from the first value output in the readout means with the input means of the amplifier circuit connected in a short circuit.

8 Claims, 1 Drawing Figure

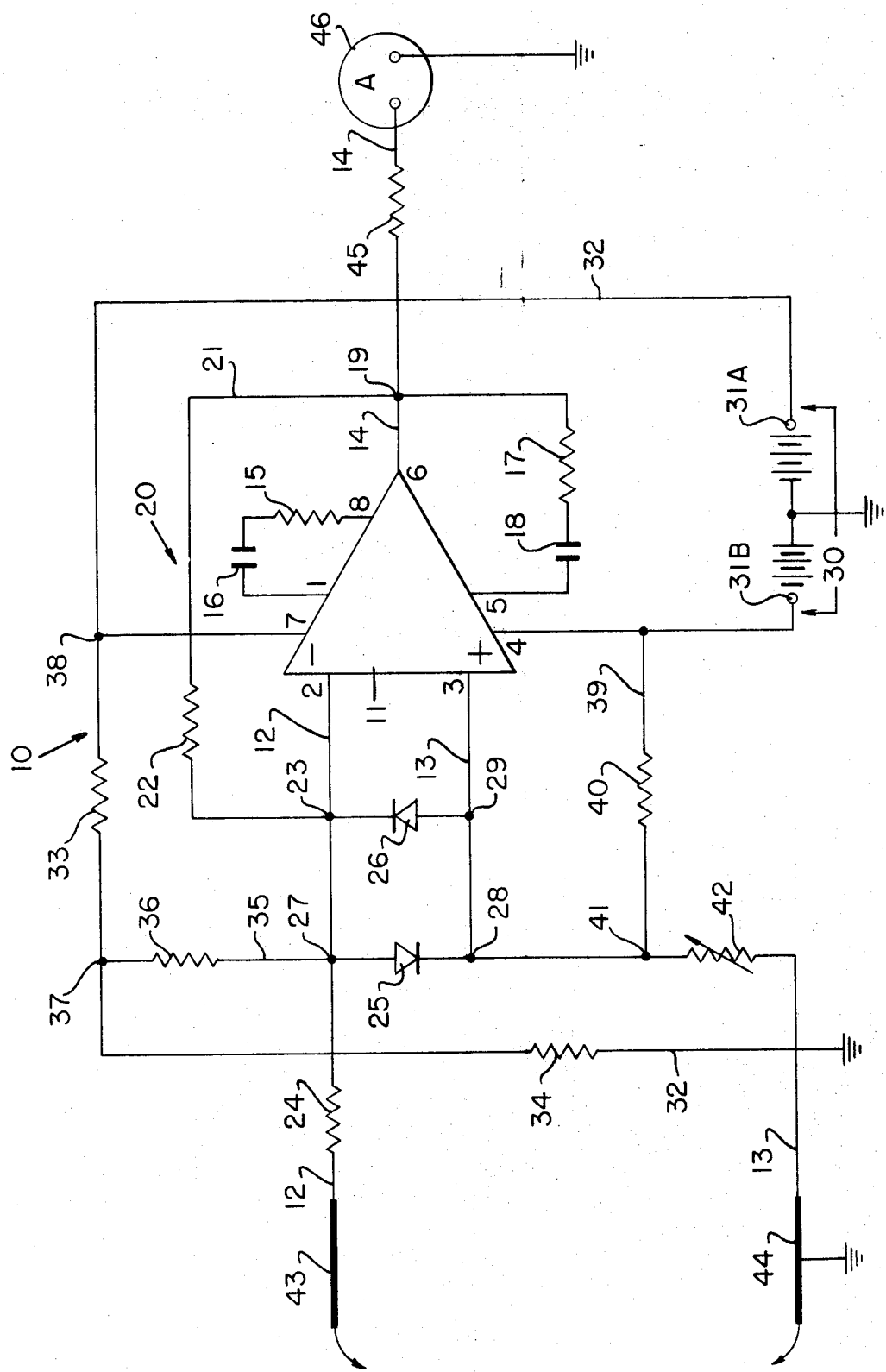

ELECTRICAL TEST APPARATUS INCLUDING HIGH GAIN AMPLIFIER CIRCUIT

BACKGROUND OF THE INVENTION

1. Field of the Invention

This invention relates to electrical test apparatuses, and more particularly to a universal type thereof, which may be employed for testing for continuity in electrical circuits. The need exists for an inexpensive, universal, hand held test apparatus, containing its own power supply, which may be used to sense current and test for the presence of short circuits in electrical circuits and, in particular, electrical circuits containing metal oxide semiconductor (MOS) devices. The need exists for a universal electrical test apparatus whose current sensing capability is sensitive enough to detect the small currents present in MOS electrical circuits, and which also does not have deleterious effects upon the circuit that is tested.

2. Summary of the Invention

It is a feature of this invention to provide a universal test apparatus which includes a high gain amplifier circuit which may comprise an operational amplifier. The operational amplifier has its output connected to a readout device. The amplifier circuit includes amplifier offset producing means for producing offset therefor so that the readout device will register two distinctively different values of output depending upon whether the input of the amplifier circuit is connected in an open or short circuit. Accordingly, continuity and short circuits in electrical circuits may be expeditiously determined. The test apparatus of the preferred embodiment may be utilized to test MOS circuits since it exhibits a small voltage (no more than 4 millivolts) between its inputs, thus ensuring that no damage or destruction of the MOS devices will occur because of forward-biasing thereof. And, the test apparatus may be also utilized to test other higher voltage and current electrical circuits.

The amplifier circuit of the test apparatus of the present invention is adapted to produce a first or reference output (substantially zero output current in the preferred embodiment) in a readout means or meter connected to the output of the amplifier when its input is connected in an open circuit, and it is adapted by reason of a deliberate input-offset voltage applied to the operational amplifier to produce a second output (substantially 25 microamperes in the preferred embodiment) substantially different from the first output in the readout means when its input is connected in a short circuit. In the preferred embodiment, compensation is made for the inherent offset of the amplifier so that the first or reference output produced in the readout means when the input of the amplifier circuit is connected in an open circuit, is of a predetermined value, for example, zero output current. Accordingly, test apparatuses having their operational amplifiers thus compensated for, will produce substantially the same first or reference output (substantially zero current in the current readout means of the preferred embodiment). Thus, the readout means will always signify to an operator an open circuit condition in a similar manner, such as a substantially zero current reading on a scale associated with a current readout means.

As is well known, it is desirable that an operational amplifier be compensated for any inherent offset. A certain input voltage is necessary to balance the operational amplifier. This input voltage, called offset, is needed because of a small bias current and voltage inherently required by the operational amplifier. An operational amplifier is normally compensated for any inherent offset, so that the amplifier circuit produces a substantially zero output whether its input is connected in an open or closed circuit. In the test apparatus of the present invention, the operational amplifier is deliberately offset to cause distinctly different outputs depending on whether the input of the amplifier is connected in an open or short circuit.

It is another feature of this invention to provide a test apparatus of the foregoing type which includes an amplifier circuit having a high gain (that is, an open loop gain of 20,000 or more) thus enabling the sensing of currents in a wire lead or printed circuit board lands of electrical circuits, which in particular, include MOS devices. The test apparatus can be used to sense current in a lead of an MOS circuit array. For example, if a voltage is applied between a point in the output of an "or" circuit containing MOS devices and the power supply input lead for the "or" circuit, the test apparatus will detect a shorted array signified by a reading (meter movement) on the readout means upscale from its position (25 microamperes, for example) registered when the inputs of the test apparatus are connected in a short circuit. In this case, the shorted MOS device (short circuit to the power supply) in the "or" circuit will carry current while the non-shorted one will not.

DESCRIPTION OF THE PREFERRED EMBODIMENT

Reference is made to the drawing which illustrates in schematic form a test apparatus according to the invention. The test apparatus comprises an amplifier circuit 10 which includes an operational amplifier 11. The amplifier circuit 10 is provided with an inverting input means or lead 12, a non-inverting input means or lead 13, and an output means or lead 14.

Although, the invention may be produced with any suitable amplifier so long as the amplifier circuit produces a first output in a readout means with the input means of the amplifier circuit connected in an open circuit, and a second distinctively different output in the readout means with the input means of the amplifier circuit connected in a short circuit, the operational amplifier is especially suited as a component of the amplifier circuit of the test apparatus because of its high gain and low input biasing currents. Operational amplifiers that can be used in the practice of this invention are described in the book entitled, Operational Amplifiers, Copyright 1971 by Burr-Brown Research Corporation, published by the McGraw-Hill Book Company.

By way of general background, an operational amplifier is a high-gain, direct-coupled amplifier. It is usually designed to amplify signals extending over a wide frequency range and is normally used with external feedback networks. Operational amplifiers have been constructed in a variety of amplifier circuit configurations, and the invention can be practiced with any suitable operational amplifier so long as the amplifier circuit produces the aforesaid first and second outputs in a readout means.

A suitable operational amplifier that can be used is identified as the $\mu$ A735 integrated operational amplifier manufactured by the Fairchild Semiconductor Division, Fairchild Camera and Instrument Corporation, Mountainview, Calif. This micropower monolithic integrated circuit operational amplifier is described with the aid of a schematic circuit diagram, to which the reader may refer to for further information, in the Application Brief, Copyright 1969, obtainable from the aforesaid Fairchild Semiconductor Division.

The micropower integrated operational amplifier is eminently suited as a component of the test apparatus of the present invention, since it has high gain, high input impedance, operates with low input biasing currents, has low standby power consumption, and is of small size. These desirable characteristics provide in a test apparatus an amplifier circuit which can find embodiment in a hand-held test probe instrument which contains its own power supply and which because of its sensitivity can be used to test integrated circuits containing MOS devices.

The $\mu$A735 operational amplifier comprises an input stage composed of an input pair of NPN transistors which comprise a differential amplifier stage fed from a current source composed of a pair of NPN transistors. A second stage includes a composite PNP/NPN differential pair with two NPN emitter follower transistors provided to prevent loading of the input stage. Two NPN transistors are provided to retain the full differential gain of the second stage while providing differential to single-ended signal conversion. The output stage includes an NPN driver transistor and four complementary symmetry Darlington-connected output transistors. The idling current in the output transistors, which is limited to 4 microamperes, is determined by a chain of four semiconductor diodes. The $\mu$A735 operational amplifier is characterized by a low standby power consumption of 100 microwatts with ± 3 volt supplies, a high input impedance of 10 megohms, a low input-offset voltage of 1 millivolt, and low input bias currents of 5 to 10 nanoamperes. The $\mu$A735 operational amplifier is a packaged device provided with terminals designated 1 through 8.

In the drawing, the operational amplifier circuit 10 is provided with an input roll-off circuit, composed of the series-connected resistor 15 and capacitor 16, which is connected to the terminals 1 and 8 of the operational amplifier 11. It is also provided with an output roll-off circuit, composed of the series-connected resistor 17 and capacitor 18, which is connected to the terminal 5 and the output lead 14 at point 19. The operational amplifier circuit 10 is further provided with an inverting feedback circuit 20, which is composed of a lead 21 including a resistor 22. The lead 21 is connected at one end to the output point 19 and at its other end to an input point 23 of the input lead 12. The operational amplifier circuit 10 further includes a resistor 24 which is included in the input lead 12, and oppositely poled diodes 25 and 26. The diode 25 has its anode connected to a point 27 of the input lead 12 and its cathode connected to a point 28 of the input lead 13, while the diode 26 has its cathode connected to the point 23 of the input lead 12 and its anode connected to a point 29 of the input lead 13.

A battery 30 is provided to supply operating potential for the amplifier circuit 10. Its' positive potential supply terminal 31A is connected by means of a lead 32 to a source of reference potential, indicated as ground. The lead 32 includes series-connected resistors 33 and 34. A lead 35, which includes a resistor 36, also makes connection from a point 37 of the lead 32 to the point 27 of the input lead 12. A connection is also made from a point 38 of the lead 32 to the terminal 7 thereby providing positive operating potential for the device 11. The negative supply terminal 31B of the battery 30 is connected to the terminal 4 of the operational amplifier 11, thereby providing negative operating potential therefor.

The negative supply terminal 31B of the battery 30 is also connected by means of a lead 39, including a resistor 40, to a point 41 of the input lead 13, which in turn, includes a variable resistor 42.

The test apparatus includes metallic probe lead means 43, which is connected to the input end of the input lead 12 of the operational amplifier circuit 10. It further includes a metallic probe lead means or lead wire 44 which is connected to the input end of the input lead 13 of the operational amplifier circuit 10. In addition, the test apparatus includes a resistor 45 which is included in the output lead 14 of the operational amplifier circuit 10. And, the output end of the output lead 14 is connected to a current readout means or ammeter 46 which, in turn, is connected to a source of reference potential, indicated as ground.

The output of the operational amplifier 11 is fed back to the inverting input lead 12 by means of the feedback circuit 20 so as to produce degenerative feedback to provide desired gain and frequency response. Gain control is achieved by selection of the value of the resistors 22 and 24. The resistors 33, 34 and 36 are provided to compensate for any inherent offset voltage of the operational amplifier 11 so that when the lead means 43 and 44 are connected in an open circuit, the reading on the ammeter 46 will be substantially zero. The input diodes 25 and 26 prevent damage to the operational amplifier 11 should the lead means 43 and 44 be accidentally connected to the leads of the battery 30 or other undesired high voltage source.

The circuits that include the battery 30 and the resistors 40 and 42 comprise a deliberate offset producing means for the amplifier 11. An input-offset voltage is provided at the point 41 so that with the input lead means 43 and 44 connected in an open circuit, the reading on the ammeter 46 will be a first value of substantially zero microamperes, that is, a current in the order of 100 nanoamperes will flow in the ammeter 46. With the input lead means 43 and 44 connected in a short circuit, the reading on the ammeter 46 will be a second substantially different value of the order of 25 microamperes.

An ideal operational amplifier develops zero output voltage when both of its inputs are at zero potential. Any output voltage which appears under the foregoing input condition can be replaced by an equivalent direct current input voltage, $V_{os}$, commonly referred to as the input offset voltage of the amplifier. The input offset voltage of an amplifier may be simply defined as the input voltage required to provide zero output voltage. In the operational amplifier circuit of the drawing, the inherent input offset voltage of the amplifier 11 is compensated for by means of the circuits including the resistors 33, 34 and 36. The amount of deliberate input offset voltage provided at the point 41 is small and has a maximum value of 600 microvolts when all of the resistance of the resistor 42 is in circuit. Therefore, with the input leads 43 and 44 connected in an open circuit, the feedback circuit 20 will operate to compensate for input offset current thus tending to keep the output of the amplifier circuit 10 at substantially zero microamperes. With the input leads 43 and 44 connected in a short circuit, current in the feedback circuit 20 will be taken away from the input or null point 23 and shunted to ground. In this latter case, the deliberate input-offset voltage appearing at the point 41 will be effective to cause the amplifier circuit 10 to produce an output of substantially 25 microamperes.

The test apparatus of the present invention is ideally suited for testing electrical circuits including MOS devices because of the high gain of the amplifier circuit 10, and because of the small voltage that exists between the inputs of the amplifier circuit. The high gain of the amplifier circuit 10 enables the test apparatus to sense the small currents present in MOS devices, while the small voltage that exists between its inputs ensures that no damage will be caused to the MOS devices under test.

The 50 microampere scale of the ammeter 46 may be used in testing electrical circuits. The deliberate input-offset voltage provided for the amplifier circuit 10 will cause the ammeter 46 to read center scale, that is, 25 microamperes, whenever the input probe leads 43 and 44 are shorted together. An isolated current measuring device, that is, one that obtains its operating current from the test apparatus and is not connected to ground potential or a separate power supply, is ideally utilized for the ammeter 46. An isolated ammeter is utilized to prevent any deleterious effects upon the amplifier circuit 10 which could be introduced thereto if it were non-isolated.

The test apparatus shown in the drawing may be constructed using the following components: Operational amplifier 11 - $\mu$A735 micropower operational amplifier manufactured by Fairchild Semiconductor, a division of Fairchild Camera and Instrument Corporation.

Resistor 15 – 30K
Capacitor 16 – 0.001 $\mu$f
Resistor 17 – 5.6K
Capacitor 18 - .004 $\mu$f
Resistors 22, 33, 36 and 40 – 3 megohms
Resistor 24 – 300 ohms
Resistor 34 – 56K
Diodes 25 and 26 – 1 N 907
Battery 30 – Six W-2 Mod. 1, 1.4 volt batteries manufactured by the Mallory Battery Company, a division of P. R. Mallory and Company.
Resistor 42 – 500 ohms
Resistor 45 – 5K
Ammeter 46 – Simpson 270 meter, manufactured by the Simpson Electric Company, Chicago, Ill.

A reduction to practice of the embodiment of the test apparatus of the present invention depicted in the drawing, using the components listed above, was characterized in that the amplifier circuit 10 has a low input-bias current in the order of 5 to 60 nanoamperes, and a high input impedance of about 10 megohms. The deliberate input-offset voltage provided for the amplifier circuit 10, whereby a current of substantially 25 microamperes is indicated on the meter 46 under a short circuit input condition, has a maximum value of 600 microvolts when the entire resistor 42 is in circuit.

While a preferred embodiment of this invention has been shown and described, various modifications and substitutions may be made without deviating from the spirit and scope of this invention. For instance, instead of providing an input-offset voltage to the amplifier circuit to cause deliberate outset thereof, such deliberate offset may be accomplished by other means so as to cause a deliberate unbalancing of the amplifier circuit.

What is claimed is:

1. A test apparatus for testing electrical circuits comprising a high gain amplifier circuit having input means and output means; and readout means connected to said output means; said amplifier circuit including amplifier offset producing means coupled to said input means for producing offset therefor; said amplifier circuit adapted to produce a first output in said readout means with said input means connected either in an open circuit or in a short circuit in the absence of said amplifier offset producing means; said amplifier circuit operable with said amplifier offset producing means to produce a second substantially different output in said readout means with said input means connected in a short circuit.

2. A test apparatus as defined in claim 1 wherein said amplifier circuit includes an operational amplifier.

3. A test apparatus for testing electrical circuits including integrated circuits containing MOS devices comprising: a high gain, direct current amplifier circuit having input means and output means; said amplifier circuit including an integrated circuit operational amplifier; and readout means connected to said output means; said amplifier circuit including amplifier offset producing means coupled to said input means for producing offset for said operational amplifier; said amplifier circuit adapted to produce a first output in said readout means with said input means connected either in an open circuit or in a short circuit in the absence of said amplifier offset producing means; said amplifier circuit operable with said amplifier offset producing means to produce a second substantially different output in said readout means with said input means connected in a short circuit.

4. A test apparatus for testing electrical circuits including integrated circuits containing MOS devices comprising: a high gain, direct current amplifier circuit having input means and output means; said amplifier circuit including an integrated circuit operational amplifier; and current readout means connected to said output means; said amplifier circuit including input-offset voltage producing means connected to said input means for producing offset voltage for said operational amplifier; said amplifier circuit adapted to produce a first output current in said readout means with said input means connected either in an open circuit or in a short circuit in the absence of said input-offset voltage producing means; said amplifier circuit operable with said input-offset voltage producing means to produce a second substantially different output current in said current readout means with said input means connected in a short circuit.

5. The test apparatus as defined in claim 4 wherein said current readout means comprises an isolated current indicating device.

6. The test apparatus as defined in claim 5 wherein said first output current has a value of substantially zero.

7. The test apparatus as defined in claim 6 wherein said input means comprises an inverting input means and a non-inverting input means and said offset voltage produced by said input-offset voltage producing means is applied to said non-inverting input means.

8. The test apparatus as defined in claim 5 further comprising first and second metallic contact means for electrical contact with an electrical circuit to be tested, said first contact means being connected to one of said input means and said second contact means being connected to the other of said input means.

* * * * *